(12) United States Patent
Vanka et al.

(10) Patent No.: US 10,949,181 B1
(45) Date of Patent: Mar. 16, 2021

(54) COMPUTING PERFORMANCE FOR EXECUTION OF FUNCTIONS CALLED BY FUNCTION HANDLES

(71) Applicant: The MathWorks, Inc., Natick, MA (US)

(72) Inventors: Rajeshwar Vanka, Woburn, MA (US); Ayon Basumallik, Framingham, MA (US); Brett Baker, Southborough, MA (US)

(73) Assignee: The MathWorks, Inc., Natick, MA (US)

( * ) Notice: Subject to any disclaimer, the term of this patent is extended or adjusted under 35 U.S.C. 154(b) by 5 days.

(21) Appl. No.: 16/188,766

(22) Filed: Nov. 13, 2018

(51) Int. Cl.
| | |
|---|---|
| *G06F 8/41* | (2018.01) |
| *G06F 9/455* | (2018.01) |
| *G06F 8/30* | (2018.01) |
| *G06F 8/36* | (2018.01) |

(52) U.S. Cl.
CPC .............. *G06F 8/4441* (2013.01); *G06F 8/30* (2013.01); *G06F 8/36* (2013.01); *G06F 8/41* (2013.01); *G06F 8/4434* (2013.01); *G06F 9/4552* (2013.01)

(58) Field of Classification Search
CPC ........ G06F 8/30; G06F 8/311; G06F 8/40–49; G06F 9/4552; G06F 8/36
USPC .................................................. 717/136–161
See application file for complete search history.

(56) References Cited

U.S. PATENT DOCUMENTS

| 6,857,118 | B2* | 2/2005 | Karr ...................... G06F 9/4486 717/114 |
| 8,397,224 | B2* | 3/2013 | Moler ...................... G06F 8/45 717/119 |
| 2003/0066051 | A1* | 4/2003 | Karr ...................... G06F 9/4486 717/114 |
| 2006/0059473 | A1* | 3/2006 | Moler ...................... G06F 8/45 717/149 |
| 2016/0019037 | A1* | 1/2016 | Varga ...................... G06F 8/315 717/151 |

OTHER PUBLICATIONS

Sherveghar, D., et al., "C++ Function Overloding: Part 1—Three Steps of Overload Resolution", blogspot.com [online], 2011 [retrieved Apr. 12, 2020], Retrieved from Internet: <URL: http://deepaksherveghar.blogspot.com/2011/09/c-function-overloding-part-1-three.html>, pp. 1-3.*

* cited by examiner

*Primary Examiner* — Todd Aguilera
(74) *Attorney, Agent, or Firm* — Wolf, Greenfield & Sacks, P.C.

(57) ABSTRACT

Extended types are defined for functions that are called by function handles in a programming environment. The extended types can be accessed and used by a computing system to improve compile-time and run-time performance of the computing system.

18 Claims, 4 Drawing Sheets

COMPUTING PERFORMANCE FOR EXECUTION OF FUNCTIONS CALLED BY FUNCTION HANDLES

SUMMARY

The described technology relates to apparatus and methods for improving creation and execution of functions called by function handles in programming environments. According to the present embodiments, extended function typing based on features of functions can be implemented in a programming environment prior to or at just-in-time compiling, so that tasks otherwise performed during compilation and/or at run-time of the function can be expedited or avoided. As a result, in some cases, execution time of a function called by a handle can be reduced by an order of magnitude or more compared to previous paradigms for executing the function.

Some embodiments relate to a computer-implemented method to improve execution of functions called by handles in a programming environment. An example method can comprise acts of receiving first information that defines a first function for executing in the programming environment, wherein the first information includes a first function handle for the first function and information about one or more features of the first function; defining a first extended type for the first function based on information about at least one of the one or more features of the first function; generating a first function handle object for the first function, wherein the first function handle object includes identifying information that identifies the first function and information about the at least one feature of the one or more features of the first function; at compile time for execution of the first function, identifying from the first function handle object that the first function handle is associated with the first extended type; and at compile time, compiling executable code for the first function based at least in part on information identified from the first extended type Some embodiments relate to a system comprising at least one processor that supports a programming environment and that is adapted to receive first information that defines a first function for executing in the programming environment, wherein the first information includes a first function handle for the first function and first information about one or more features of the first function; define a first extended type for the first function based on information about at least one of the one or more features of the first function; at compile time for execution of the first function, identify that the first function handle is associated with the first extended type; at compile time, compile the executable code for the first function based at least in part on information identified from the first extended type; and at run-time, execute the executable code for the first function.

Some embodiments relate to computer-readable medium encoding instructions that, when executed by one or more processors, adapt the one or more processors to execute acts that improve execution of functions called by handles in a programming environment, the acts comprising: receiving a call to a first function handle for a first function that implements a first algorithm; at compile time, identifying that the first function handle is associated with an extended type defined for the first function; at compile time, compiling executable code for the first function, wherein the executable code depends at least in part on information from the extended type; and at run-time, executing the executable code for the first function.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

The features and advantages of the present invention will become more apparent from the detailed description set forth below when taken in conjunction with the drawings.

DETAILED DESCRIPTION

The present embodiments relate to improving creation and execution speed of functions that are called by handles in programming environments. In embodiments and in overview, information about a function (such as, but not limited to, an identifier or name for the function and information about function features) can be captured by a computing system when a function is created or defined, and the information can be used to generate an extended type for the function. Different extended types can be defined for different functions that have different features associated with them. Function features can include, but are not limited to input value(s) or input parameter(s), number of input values, values that are visible to the function and defined outside the function, number of visible values, data types of input values and/or visible values, etc. When a function is compiled and executed, the extended type of the function can be determined, for example at just-in-time compile time on some systems. The determined extended type can be used to select associated code that is external to the function itself for execution of the function and avoid carrying out certain tasks during execution of the function that would otherwise be required for runtime function execution without the extended type definition. Such compile time selection of associated code and avoidance of tasks can greatly increase the execution speed of the function in the programming environment. In some implementations, the associated code that is compiled for a function of an extended type may be compiled once and reused without recompiling when the function, or another function having a same extended type, is subsequently called during a user session. The ability to identify and reuse compiled associated code for execution of a function reduces overall execution time of functions in a computing system.

Figure 1A:
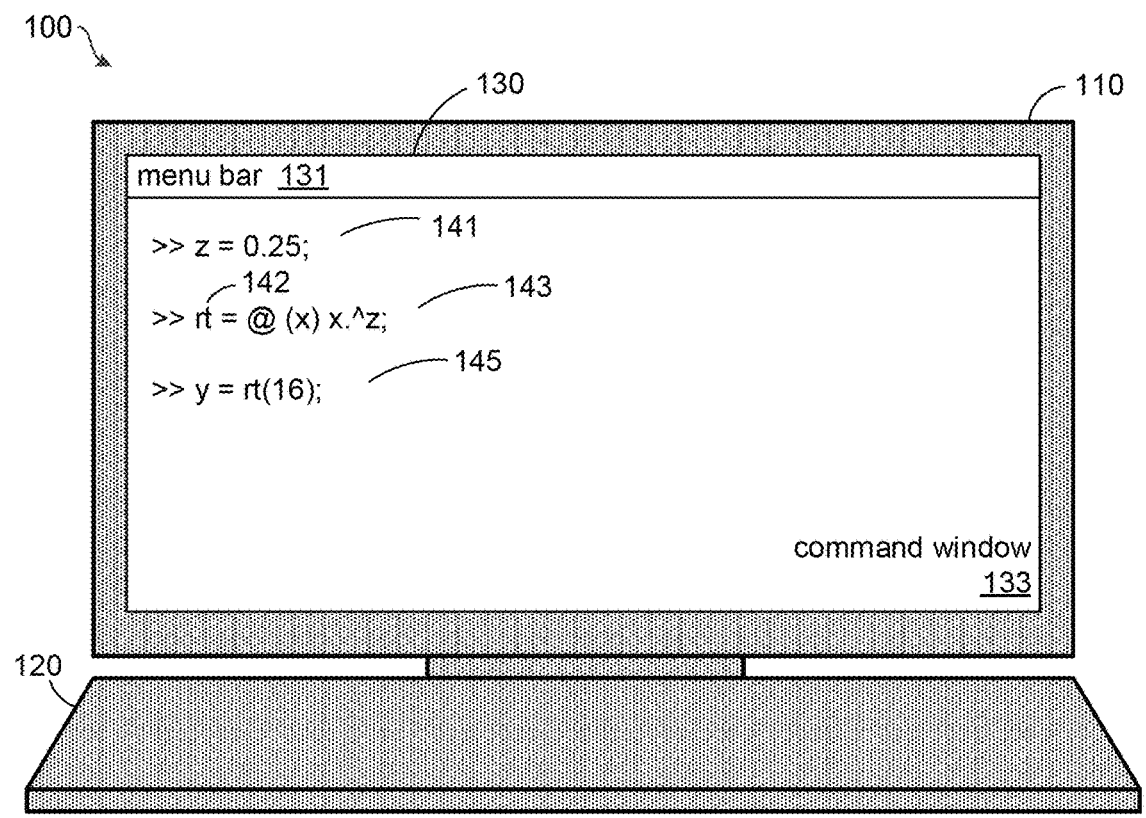
FIG. 1A depicts example components of a computing system on which a programming environment that uses extended function typing for improved function execution speed can be implemented.
Figure 1B:
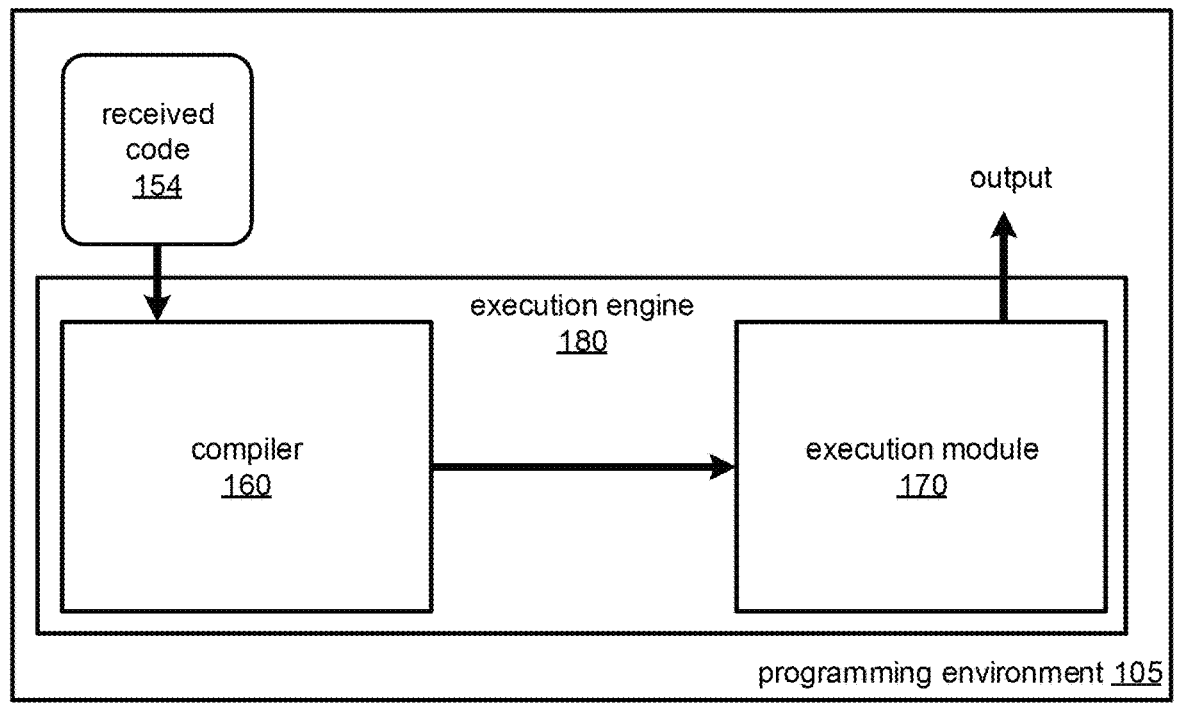
FIG. 1B depicts example components of a programming environment in which extended function typing can be implemented.

FIG. 1A is a simplified illustrated example of user-visible components of a computing system 100 that can support a programming environment in which the present embodiments can be implemented. In the illustrated example, the computing system 100 comprises a display 110 and keyboard 120 that connect to at least one processor and at least one memory device that are not shown in the drawing because of their sophistication (hundreds, thousands, millions or more of integrated circuit devices) and comparative size (each device having micron or sub-micron-scale features). A user interface 130 can be rendered by the at least one processor on the display 110 that, in combination with the keyboard 120, allow a user to operate and interact with a programming environment 105, an example of which is depicted in FIG. 1B. In embodiments, the user interface 130 can comprise a menu bar 131 and a command window 133. The menu bar 131 can include active text, active icons, and/or tabs that allow a user to access and select various features and functionalities of the programming environment 105. The command window 133, in some embodiments, can render text entered by a user via the keyboard 120 or other means (e.g., voice recognition) as well as display results that are output by the programming environment 105 (e.g., results that are output from execution of code by execution engine 180). Further detailed examples of computing systems on which the present embodiments can be implemented are described below in connection with FIG. 5.

The illustration of FIG. 1A shows three example lines of input code 141, 143, 145 that may be entered by a user when operating a programming environment 105 according to embodiments described herein. As an example, a user may write/input such computer code that is used to operate an electrical or electro-mechanical system. In a first line of code 141 a mathematical operation is defined that assigns the value of 0.25 to the variable "z". In a second line of code 143, an anonymous function is defined. The anonymous function can be given an identifying function handle 142 ("rt" in this example), that is used during compilation and runtime in the programming environment 105 to identify the anonymous function. Additionally, the anonymous function can be given a user-defined algorithm. In this example, the anonymous function raises an input value x to a power defined by the value of z. Given z is 0.25 in the example case, the anonymous function effectively takes the cube root of the input value x. In the third line of code 145, when input for execution, the anonymous function is called.

Anonymous functions can be useful programming constructs that can make code more compact and flexible. In some cases, anonymous functions may be functions that are defined in a single line of code (as depicted in FIG. 1A), or a few lines of code. Code that defines an anonymous function may or may not be stored in a program file or separate file. In some implementations, code that defines an anonymous function is not stored as a portion of code having an explicit function definition statement indicating that a function operation will be defined in subsequent lines of code. Anonymous functions may be supported by dynamic programming languages such as MATLAB® available from The MathWorks, Inc., of Natick, Mass. Anonymous functions may be supported by other programming languages such as, but not limited to, JAVASCRIPT, PYTHON, JULIA, and Ruby.

Although anonymous functions are described in FIG. 1A, the invention is not limited to only anonymous functions and their handles. The described embodiments can also be applied to other types of named functions and associated handles for the named functions in program code. Other types of functions include local functions, nested functions, and functions having a handle defined on a "path" that comprises files and directories or folders made accessible to the programming environment 105 during a user session. Local functions may be defined during a user session on a path and are only visible to code executing from the path. An example in which a local function "local1" is declared and a local function handle "x" is defined is given in the following lines of code, which could be input to a programming environment 105.

```
foo.m
function x=foo
  x=@local1;
  y-x(1);
end
function b=local1(a)
  b=a+1;
end
```

An example of a nested function in which a nested function handle "x" is defined is given in the following example code, which could be input to a programming environment 105.

```
function x=foo
  function b=nest1(a)
    b=a+1;
  end
  x=@nest1;
  y=x(1);
end
```

An example in which a function handle "x" is defined on a path and the corresponding function "foo" is declared, or will be declared, somewhere on the path is given in the following lines of code.

```
x=@foo;
y=x(1);
```

For the example shown in FIG. 1A, the anonymous function has several features. A first feature is that it takes one input value or parameter (assigned to x) that is to be operated on according to the algorithm coded for the function. A second feature is that the function also takes a visible value (0.25 that is assigned to z) that is used to perform the function's operation on the input value. The visible value may be passed through a variable, "z" in this example, and may also be referred to as a "snapped value." The value for z can be flexibly defined in other portions of code outside of the anonymous function and the defined value for z is visible to the anonymous function when compiled (e.g., the function can reference the currently-assigned value of z). For a value to be visible to a function, the variable is either declared locally within the function or declared as a global variable. In embodiments, there can be more than one input value and more than one visible value for an anonymous function. In addition to number of input values and number of visible values, there can be other features associated with a function (e.g., input value data type (e.g., int, double, etc.), output value data type, visible value data type (e.g., int, double, etc.) and type(s) of operations performed by the function (e.g., Boolean, simple arithmetic, truncation, type casting, etc.).

Referring now to FIG. 1B, an example programming environment 105 is depicted that can support creating, compiling, and executing functions that are called by function handles. In overview, embodiments of a programming environment 105 can include an execution engine 180 that includes a compiler 160 and an execution module 170. Each of the compiler 160 and execution module 170 can be implemented as hardware that has been adapted with code (e.g., machine-readable instructions produced from software code) to execute particular functionalities relating to compilation and execution of received code 154. In some embodiments, the received code 154 can be input in real time by a user or read from one or more files that store computer code.

In operation and in some cases, compiler 160 can transform received programming code, written in a first language (e.g., source code written in a dynamic programming language), into code of a second or target language for execution by the execution module 170. Received code 154 can include anonymous functions, local functions, nested functions, and their associated function handles. For such functions, generation of extended type and function calls can proceed as described in connection with FIG. 2 and FIG. 3 below.

Figure 2:
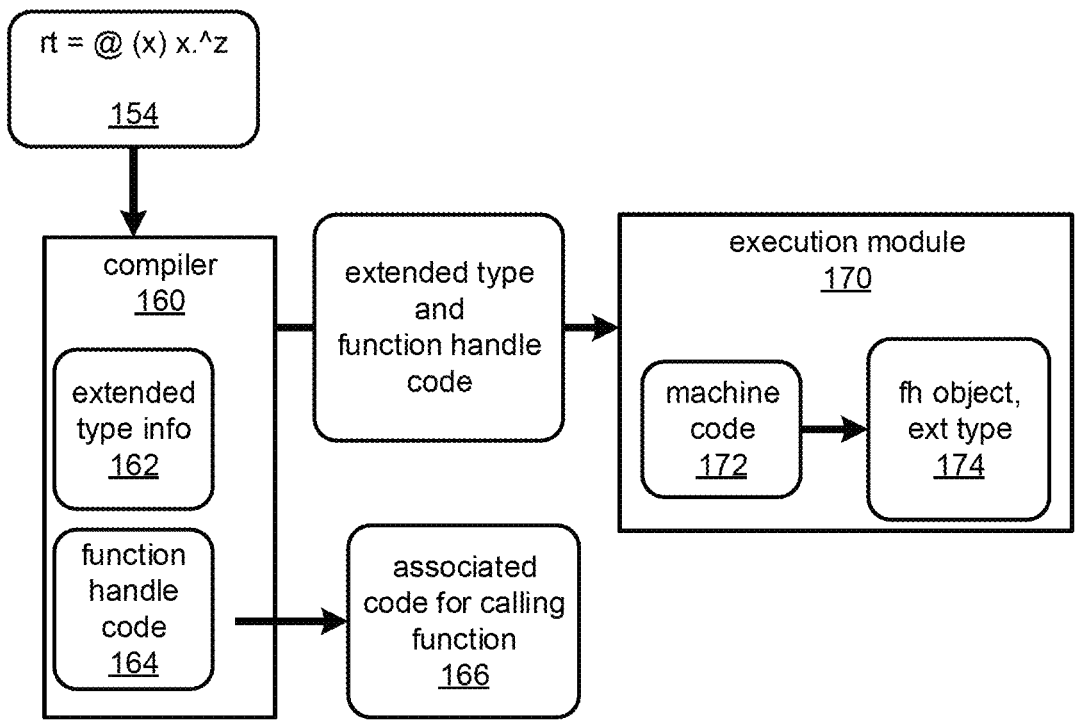
FIG. 2 depicts, in overview, an example process for defining an extended type and creating a function handle object for an anonymous function.

The inventors have recognized and appreciated that significant improvements in execution speed of functions called by handles can be achieved by defining an extended type for functions at or prior to compile time. FIG. 2 illustrates an example operation in a programming environment 105 in which an extended type and function handle are defined for an anonymous function. According to some embodiments, a compiler 160 can receive code 154 defining an anonymous function identified by a function handle "rt". In the illustrated example, the anonymous function performs a mathematical operation (x.^z) of raising one input value "x" to a power having a value associated with the variable "z." Data types of inputs and outputs for the function can also be provided to or determined by the compiler 160. The compiler 160 can construct an extended type which comprises extended type information 162 about the function (e.g., function identifier, a pointer to the function, input and output data types, number of visible values passed to the function, identifiers for the visible values, or some combination thereof). The extended type information 162 can be stored as data in memory by the compiler 160. The extended type information may be stored by the compiler 160 in any suitable form (e.g., a file, object, or data block), and can be associated with its corresponding function handle ("rt" in the illustrated example). In some implementations, the extended type information 162 may include a pointer to the corresponding function. In some cases, an extended type associated with a function handle can comprise a compact identifier (e.g., an alpha-numeric sequence, a pointer) that identifies or is used to determine the location of extended type information 162 for a function. Such a compact identifier can be used as an abbreviated form of extended type. As described herein, extended type information 162 may be referred to collectively as "extended type." In embodiments, compiler 160 can also produce function handle code 164 to create a function handle object for the anonymous function.

According to some embodiments, the compiler 160 can provide the extended type information 162 and function handle code 164 for creating a function handle object to the execution module 170. In some cases, the compiler 160 may identify where the extended type information 162 and code 164 can be accessed from memory. The code 164 for creating a function handle object may comprise machine code 172 that is executed by execution module 170 to produce a function handle object 174 that includes some or all of the extended type information 162. When machine code 172 is executed, variable "rt" is recognized by the programming environment 105 as a function handle. The function handle object 174 and associated extended type can be stored in memory for subsequent use, according to some embodiments.

The compiler can also generate compiled associated code 166 for a specific extended type of function (e.g., generated to accept a certain number of input values and visible values). The associated code may, in some cases, comprise an adaptor that assists with execution of the function. In some implementations, visible values for a function are passed to the associated code 166 at compile time. Once the associated code 166 is generated, it can be used for different functions having a same extended type (e.g., a function implementing a different algorithm but having a same number of inputs with the same input data types, and the same number of visible values with the same visible value data types.) Accordingly, associated code need not be generated for each function that is created and compiled for execution. However, there can be a plurality of different associated codes (e.g., adaptors) when there are a plurality of functions having different extended types. By allowing one associated code 166 to service different functions of a same extended type and not requiring the associated code to be compiled for each call to the different functions, substantial reductions in compile and call times can be achieved. Additionally, less memory is required for associated code 166 when the same associated code 166 can be used for multiple different functions having a same extended type. The reduction in compile and call times and reduced memory contribute to improved computer performance.

Figure 3:
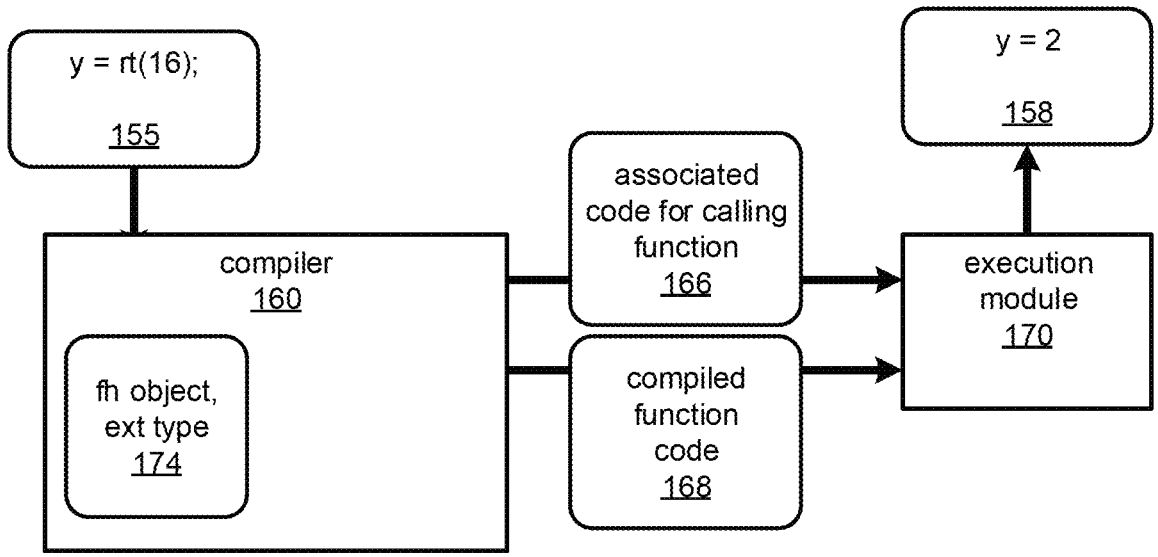
FIG. 3 illustrates an example process in which a handle of an anonymous function is called and executed.

FIG. 3 illustrates an example operation in which a function handle is called in a programming environment 105. In embodiments, a compiler 160 can receive a line of code 155 that includes a call to a function handle ("rt" in the illustrated example). The compiler 160, using the function handle for referencing, can access the corresponding function handle object 174 and extended type information to identify an extended type for the function. Once the extended type is identified, the compiler 160 can select associated code 166 (e.g., an adaptor) for the extended type that is provided to the execution module 170 to call and execute the function. The associated code 166 can be generated by the compiler 160 for a first call to the function and then reused, without recompiling, during a user session for subsequent calls to the function or subsequent calls to functions having a same extended type. The compiler 160 can then compile function code 168 for execution of the particular function associated with the called function handle. Subsequently, the execution module 170, making use of the associated code 166, can execute the compiled function code 168 and produce an output 158 (y=2 in the illustrated example) for display or storage. After execution of the function is complete, the execution module 170 may destroy artifacts in memory created for execution of the function.

By re-using compiled associated code 166 for functions having a same extended type, overhead time associated with compiling and calling functions of a same extended type can be reduced. The inventors have seen reductions in run-time execution of a function by an order of magnitude or more compared to an approach in which associated code 166 is created and compiled for each function call. Additionally, time associated with destroying artifacts created during a function call and execution can be reduced (by a factor of two or more) when the extended type information is known by the execution module 170. For example, if the extended type information indicates that the function handle object 174 cannot contain objects with cycles, the execution module 170 can avoid performing cycle detection on the function artifacts upon destruction of the function artifacts. As another example, if the extended type information indicates that the function handle object 174 cannot contain objects that call arbitrary user-written code upon destruction, the execution module 170 can destroy the function artifacts using a more optimized code path than if the execution module 170 had to account for the possibility of calls to arbitrary code.

Figures 4A, 4B:
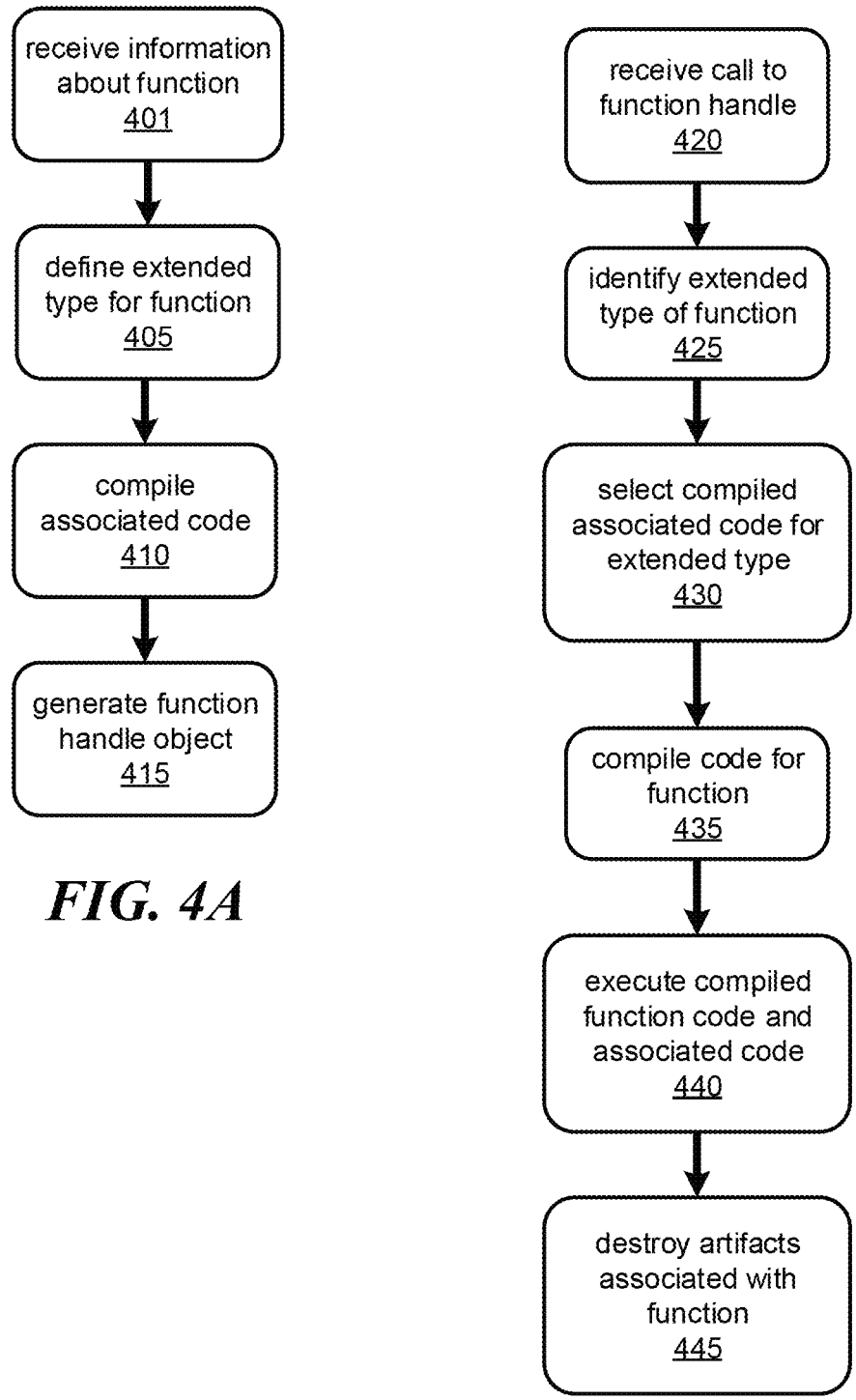
FIG. 4A illustrates an example method in which an extended type is defined for a function.
FIG. 4B illustrates an example method in which an extended type is used to identify compiled associated code that assists with execution of a function.

FIG. 4A and FIG. 4B depict example methods associated with generating extended types for, and executing, functions called by a handle for a named function in programming code. According to some embodiments, a method for generating an extended type for a function called by a function handle can comprise receiving (act 401), in a programming environment 105, information about a function and defining (act 405) an extended type for the function based on the received information, as described above in connection with FIG. 2. A method can further include compiling (act 410), at compile time by compiler 160, associated code (e.g., an adapter) that can assist in executing the function. A method may also include, at run-time, generating (act 415) a function handle object for the function.

The example acts illustrated in FIG. 4B relate to execution of a function called by a handle for a named function in programming code. An example method for executing a function called by a function handle can comprise receiving (act 420) a call to a function handle in a programming environment 105, and identifying (act 425) an extended type for the called function handle, as described above in connection with FIG. 3. A method can further include selecting (act 430) the associated code 166 for the identified extended type of function, and compiling (act 435) code for the function called by the function handle. Acts 420 through 435 can be carried out at compile time, for example. A method for executing a function called by a handle can further include executing (act 440) the compiled function code and associated code, and destroying (act 445) artifacts associated with the function after execution of the function is complete.

Referring again to FIG. 2 and FIG. 3, in some embodiments, associated code 166 may not be generated and used. Instead, the executable code 168 can be modified based on the call site to the function. For example, new executable code can be generated for the function that combines the functionality provided by the associated code and the executable code 168. The extended type and related information from the function call would be used for generating the, modified executable code for the function rather than selecting associated code 166.

Figure 5:
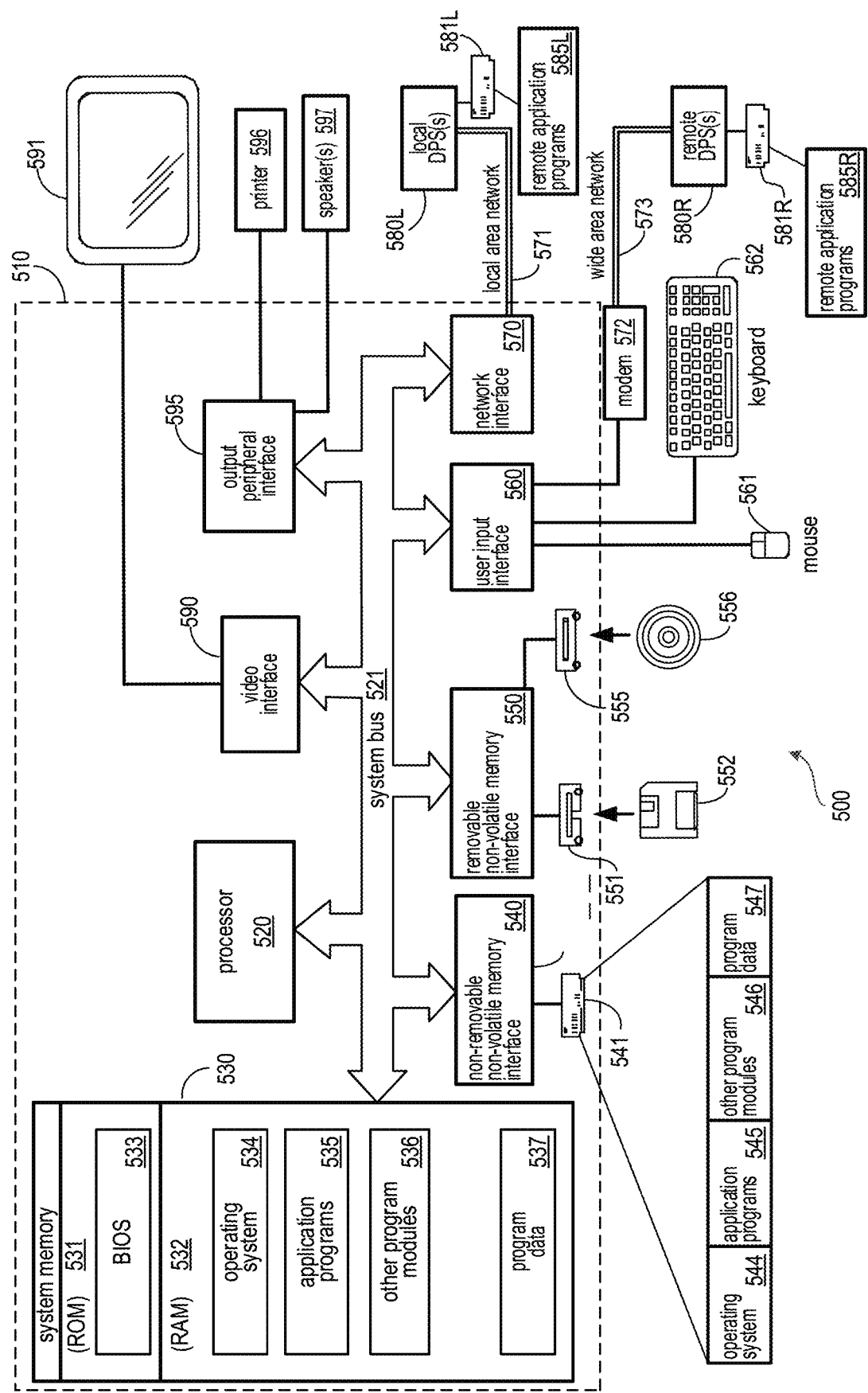
FIG. 5 illustrates an example computing system that can be specially adapted with computer programming instructions to implement a programming environment with improved function execution as described in embodiments below.

FIG. 5 depicts further details of a computing system 500 that can be adapted to implement extended typing of functions called by handles as described above. Some or all of the components shown may be present in a computing system of the present embodiments, for example. In a distributed computing environment, some components may be located on a server and some components may be located on a client device. In some embodiments, a device for implementing extended typing of functions can include a computing device 510 which can be embodied as a desktop computer, a workstation, or a laptop computer. Suitable workstations include Dell Precision series of workstations from Dell, Inc. of Round Rock, Tex., the HP Z400, Z600 and Z800 series of workstations from Hewlett Packard Co. of Palo Alto, Calif., among others. Other computing devices that may be used include palm computers and other portable computing devices, e.g., smart phones.

Components of computing device 510 can include, but are not limited to, a processor 520, a memory 530, and a bus 521 that couples various components including the memory to the processor 520. Example processors 520 include, but are not limited to, single or multicore processors, such as the Core™ Pentium®, or Celeron® families of processors from Intel Corp. of Santa Clara, Calif., or the Phenom, AMD Athlon or AMD Opteron families of processors from Advanced Micro Devices, Inc. of Sunnyvale, Calif., among others.

The bus 521 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 510 can include one or more types of machine-readable media. Machine-readable media can be any available media that can be accessed by computing device 510 and includes both volatile and nonvolatile, manufactured storage media, removable and non-removable manufactured storage media. By way of example, and not limitation, machine-readable media may comprise information such as computer-readable instructions, data structures, program modules or other data. Machine-readable media includes, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information and which can be accessed by computing device 510.

The memory 530 can include computer storage media in the form of volatile and/or nonvolatile memory such as read only memory (ROM) 531 and random access memory (RAM) 532. A basic input/output system 533 (BIOS), containing the basic routines that help to transfer information between elements within computing device 510, such as during start-up, may be stored in ROM 531. RAM 532 may contain data and/or program modules that are immediately accessible to and/or presently being operated on by processor 520. By way of example, and not limitation, FIG. 5 illustrates an operating system 534, application programs 535, other program modules 536, and program data 537.

The computing device 510 can also include other removable/non-removable, volatile/nonvolatile machine-readable media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile machine-readable media that can be used in the exemplary operating environment include, but are not limited to, magnetic tape cassettes, flash memory cards, digital versatile disks, digital video tape, solid state RAM, solid state ROM, and the like. The hard disk drive 541 may be connected to the system bus 521 through a non-removable memory interface such as interface 540, and magnetic disk drive 551 and optical disk drive 555 may be connected to the system bus 521 by a removable memory interface, such as interface 550.

The drives and their associated machine-readable media discussed above and illustrated in FIG. 5, provide storage of machine-readable instructions, data structures, program modules and other data for the computing device 510. In FIG. 5, for example, hard disk drive 541 is illustrated as storing operating system 544, application programs 545, other program modules 546, and program data 547. These components may either be the same as, or different from, operating system 534, application programs 535, other program modules 536, and program data 537. Operating system 544, application programs 545, other program modules 546, and program data 547 are given different numbers here to illustrate that, at a minimum, they are different copies.

A user can enter commands and information into the computing device 510 through input devices such as a keyboard 562 and pointing device 561, commonly referred to as a mouse, trackball or touch pad. Other input devices (not shown) can include a microphone, joystick, game pad, satellite dish, scanner, or the like. These and other input devices can be connected to the processor 520 through a user input interface 560 that is coupled to the system bus, but can be connected by other interface and bus structures, such as a parallel port, game port or a universal serial bus (USB). A monitor 591 or other type of display device can also be connected to the system bus 521 via an interface, such as a video interface 590. In addition to the monitor, a computing device 510 can also include other peripheral output devices such as speakers 597 and printer 596, which can be connected through an output peripheral interface 595.

The computing device 510 can operate in a networked environment using logical connections to one or more remote devices, such as a remote computers 580L and 580R. The remote computers 580L and 580R may be a personal computer, a server, a router, a network PC, a peer device or other common network node, and may include many or all of the elements described above relative to the computing device 510, although only a memory storage device 581L and 581R has been illustrated in FIG. 5. The logical connections depicted in FIG. 5 include a local area network (LAN) 571 and a wide area network (WAN) 573, but may also include other networks. Such networking environments may be commonplace in offices, enterprise-wide computer networks, intranets and the Internet. Network connections can be wired, optical fiber based, or wireless.

When used in a LAN networking environment, the computing device 510 can be connected to the LAN 571 through a network interface or adapter 570. When used in a WAN networking environment, the computing device 510 may include a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computing device 510, or portions thereof, may be stored in a remote memory storage device. By way of example, and not limitation, FIG. 5 illustrates remote application programs 585L and 585R as residing on memory devices 581L and 581R, respectively. It will be appreciated that the network connections shown are exemplary and other means of establishing a communications link between the computers may be used.

Execution of functions called by handles in a programming environment can be implemented in various configurations. Example configurations include combinations of method configurations (1) through (12) as described below.

(1) A computer-implemented method to improve execution of functions called by handles in a programming environment, the method comprising: receiving first information that defines a first function for executing in the programming environment, wherein the first information includes a first function handle for the first function and information about one or more features of the first function; defining a first extended type for the first function based on information about at least one of the one or more features of the first function; generating a first function handle object for the first function, wherein the first function handle object includes identifying information that identifies the first function and information about the at least one feature of the one or more features of the first function; at compile time for execution of the first function, identifying from the first function handle object that the first function handle is associated with the first extended type; and at compile time, compiling executable code for the first function based at least in part on information identified from the first extended type.

(2) The method of (1), wherein the information about the at least one feature comprises a number of input values for the first function that are used by the first function during execution of the first function.

(3) The method of (1) or (2), wherein the first function is an anonymous function.

(4) The method of (1) or (2), wherein the first function is a local function.

(5) The method of any of (1) through (3), further comprising: including a first pointer to the first function in the first function handle; and associating the first extended type with the first function handle.

(6) The method of any of (1) through (5), wherein the information about the at least one feature comprises a number of visible values for the first function that are defined for the first function in the programming environment and used by the first function during execution of the first function.

(7) The method of any of (1) through (6), wherein the information about the at least one feature further comprises a data type for at least one of the visible values.

(8) The method of (6) or (7), further comprising: compiling first associated code to assist in execution of the first function; at compile time, identifying the first associated code based on the first extended type for executing with the executable code during run-time of the first function; and at run-time, executing the first associated code and the executable code for the first function.

(9) The method of (8), further comprising passing the visible values to the associated code at compile time.

(10) The method of (8) or (9), further comprising generating the first associated code at compile time.

(11) The method of any of (8) through (10), further comprising: receiving second information that defines a second function, wherein the second information includes information about one or more features of the second function; generating a second function handle object wherein the second function handle object includes identifying information that identifies the second function and information about at least one feature of the one or more features of the second function; determining that the second function is of a same extended type as the first function; and at compile time, selecting the associated code generated for the first function for execution of the second function, without generating associated code for the second function.

(12) The method of any of (8) through (11), further comprising, in response to a subsequent call of the first function, performing acts of: at compile time, determining that the first function handle object generated for the first function is associated with the first extended type; and choosing the associated code for execution of the first function based on determining that the first function handle object is associated with the first extended type, without executing acts of: defining an additional extended type for the first function; and generating additional associated code for the first function.

Further example configurations include combinations of system configurations (13) through (19) as described below.

(13) A system comprising at least one processor that supports a programming environment adapted to: receive first information that defines a first function for executing in the programming environment, wherein the first information includes a first function handle for the first function and first information about one or more features of the first function; define a first extended type for the first function based on information about at least one of the one or more features of the first function; at compile time for execution of the first function, identify that the first function handle is associated with the first extended type; at compile time, compile the executable code for the first function based at least in part on information identified from the first extended type; and at run-time, execute the executable code for the first function.

(14) The system of (13), wherein the information about the one or more features comprises a number of input values and/or visible values for the first function that are used by the first function during execution of the first function.

(15) The system of (13) or (14), wherein the information about the one or more features further comprises data types for the input values and/or visible values.

(16) The system of any one of (13) through (15), wherein the first function is an anonymous function.

(17) The system of any one of (13) through (16), wherein the at least one processor is further adapted to generate a function handle object for the first function at compile time.

(18) The system of any one of (13) through (15), wherein the at least one processor is further adapted to: compile associated code to assist in execution of the first function; identify the associated code for executing with the executable code of the first function; and at run-time, execute the associated code with the executable code for the first function.

(19) The system of (18), wherein the at least one processor is further adapted to: receive second information that defines a second function and includes second information about one or more features of the second function; determine that the second information about the one or more features of the second function is the same as the first information about the one or more features of the first function; and at compile time, select the associated code compiled for the first function for execution of the second function, without compiling associated code for the second function.

Further example configurations include combinations of computer-readable medium configurations (20) through (23) as described below.

(20) Computer-readable medium encoding instructions that, when executed by one or more processors, adapt the one or more processors to execute acts that improve execution of functions called by handles in a programming environment, the acts comprising: receiving a call to a first function handle for a first function that implements a first algorithm; at compile time, identifying that the first function handle is associated with an extended type defined for the first function; at compile time, compiling executable code for the first function, wherein the executable code depends at least in part on information from the extended type; and at run-time, executing the executable code for the first function.

(21) The computer-readable medium of (20), wherein the extended type includes information about a number of input values and/or a number of visible values that are used by the first function during execution of the first function.

(22) The computer-readable medium of (20) or (21), further encoding instructions to adapt the one or more processors to execute acts of: at compile time and based on the extended type, identifying associated code that was compiled for functions of a same extended type prior to receiving the call to the first function handle, wherein the associated code assists in executing the executable code for the first function; and at run-time, executing the associated code with the executable code for the first function.

(23) The computer-readable medium of (22), further encoding instructions to adapt the one or more processors to: receive a call to a second function handle for a second function that implements a second algorithm that is different from the first algorithm; at compile time, identify that the second function handle is associated with the extended type defined for the first function; at compile time and based on the extended type, identify the first associated code to assists in executing executable code for the second function; at compile time, compile executable code for the second function; and at run-time, execute the associated code and the executable code for the second function without recompiling the associated code.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A computer-implemented method to improve execution of functions called by handles in a programming environment, the method comprising:

receiving first information that defines a first function for executing in the programming environment, wherein the first information includes a first function handle for the first function and information about one or more features of the first function, and wherein the information about the one or more features comprises a number of visible values for the first function that are defined for the first function in the programming environment and used by the first function during execution of the first function;

defining a first extended type for the first function based on information about at least one of the one or more features of the first function;

generating a first function handle object for the first function, wherein the first function handle object includes identifying information that identifies the first function and information about the at least one of the one or more features of the first function;

at compile time for execution of the first function, identifying from the first function handle object that the first function handle is associated with the first extended type;

at compile time, compiling executable code for the first function based at least in part on information identified from the first extended type;

compiling associated code to assist in execution of the first function;

at compile time, identifying the associated code based on the first extended type for executing with the executable code during run-time of the first function;

in response to a subsequent call of the first function, performing acts of:
   at compile time, determining that the first function handle object generated for the first function is associated with the first extended type; and
   choosing the associated code for execution of the first function based on determining that the first function handle object is associated with the first extended type; and
at run-time, executing the associated code and the executable code for the first function.

2. The method of claim 1, wherein the information about the one or more features further comprises a number of input values for the first function that are used by the first function during execution of the first function.

3. The method of claim 1, wherein the first function is an anonymous function.

4. The method of claim 1, wherein the first function is a local function.

5. The method of claim 1, further comprising:
including a first pointer to the first function in the first function handle; and
associating the first extended type with the first function handle.

6. The method of claim 1, wherein the information about the one or more features further comprises a data type for at least one of the visible values.

7. The method of claim 1, further comprising passing the visible values to the associated code at compile time.

8. The method of claim 1, further comprising generating the associated code at compile time.

9. The method of claim 1, further comprising:
receiving second information that defines a second function, wherein the second information includes information about one or more features of the second function;
generating a second function handle object wherein the second function handle object includes identifying information that identifies the second function and information about at least one feature of the one or more features of the second function;
determining that the second function is of a same extended type as the first function; and
at compile time, selecting the associated code generated for the first function for execution of the second function, without generating associated code for the second function.

10. A system comprising at least one processor that supports a programming environment, wherein the at least one processor is adapted to:
receive first information that defines a first function for executing in the programming environment, wherein the first information includes a first function handle for the first function and information about one or more features of the first function, and wherein the information about the one or more features comprises a number of visible values for the first function that are defined for the first function in the programming environment and used by the first function during execution of the first function;
define a first extended type for the first function based on information about at least one of the one or more features of the first function;
generate a first function handle object for the first function, wherein the first function handle object includes identifying information that identifies the first function and information about the at least one of the one or more features of the first function;
at compile time for execution of the first function, identify from the first function handle object that the first function handle is associated with the first extended type;
at compile time, compile the executable code for the first function based at least in part on information identified from the first extended type;
compiling associated code to assist in execution of the first function;
at compile time, identifying the associated code based on the first extended type for executing with the executable code during run-time of the first function;
in response to a subsequent call of the first function, performing acts of:
   at compile time, determining that the first function handle object generated for the first function is associated with the first extended type; and
   choosing the associated code for execution of the first function based on determining that the first function handle object is associated with the first extended type; and
at run-time, execute the associated code and the executable code for the first function.

11. The system of claim 10, wherein the information about the one or more features further comprises a number of input values for the first function that are used by the first function during execution of the first function.

12. The system of claim 11, wherein the information about the one or more features further comprises data types for the input values and/or visible values.

13. The system of claim 10, wherein the first function is an anonymous function.

14. The system of claim 10, wherein the at least one processor is further adapted to generate the function handle object for the first function at compile time.

15. The system of claim 10, wherein the at least one processor is further adapted to:

receive second information that defines a second function and includes second information about one or more features of the second function;

determine that the second information about the one or more features of the second function is the same as the information about the one or more features of the first function; and at compile time, select the associated code compiled for the first function for execution of the second function, without compiling associated code for the second function.

16. A non-transitory computer-readable medium encoding instructions that, when executed by one or more processors, adapt the one or more processors to execute acts that improve execution of functions called by handles in a programming environment, the acts comprising:

receiving first information that defines a first function for executing in the programming environment, wherein the first information includes a first function handle for the first function and information about one or more features of the first function, and wherein the information about the one or more features comprises a number of visible values for the first function that are defined for the first function in the programming environment and used by the first function during execution of the first function;

defining a first extended type for the first function based on information about at least one of the one or more features of the first function;

generating a first function handle object for the first function, wherein the first function handle object includes identifying information that identifies the first function and information about the at least one of the one or more features of the first function;

at compile time for execution of the first function, identifying from the first function handle object that the first function handle is associated with the first extended type;

at compile time, compiling executable code for the first function based at least in part on information identified from the first extended type;

compiling associated code to assist in execution of the first function;

at compile time, identifying the associated code based on the first extended type for executing with the executable code during run-time of the first function;

in response to a subsequent call of the first function, performing acts of:

at compile time, determining that the first function handle object generated for the first function is associated with the first extended type; and choosing the associated code for execution of the first function based on determining that the first function handle object is associated with the first extended type; and at run-time, executing the associated code and the executable code for the first function.

17. The computer-readable medium of claim 16, wherein the information about the one or more features further comprises a number of input values for the first function that are used by the first function during execution of the first function.

18. The computer-readable medium of claim 16, further encoding instructions to adapt the one or more processors to:

receive a call to a second function handle for a second function that implements a second algorithm that is different from a first algorithm implemented by the first function;

at compile time, identify that the second function handle is associated with the first extended type defined for the first function;

at compile time and based on the first extended type, identify the associated code to assist in executing executable code for the second function;

at compile time, compile executable code for the second function; and at run-time, execute the associated code and the executable code for the second function without recompiling the associated code.

* * * * *